E. A. HICKMAN.
Improvement in Apparatus for Illustrating Trigonometry.
No. 115,318.                            Patented May 30, 1871.
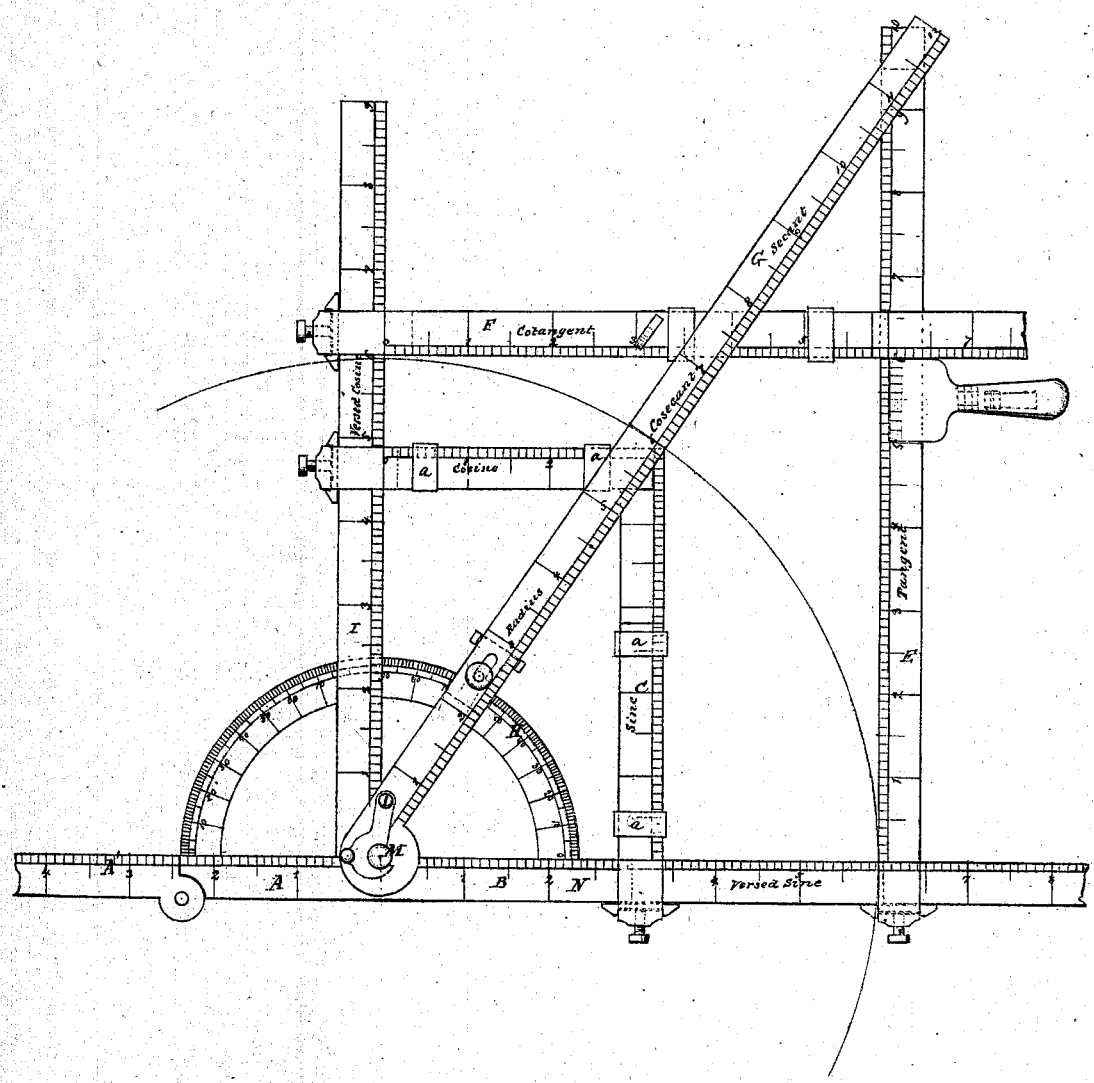

UNITED STATES PATENT OFFICE.

EDWIN A. HICKMAN, OF INDEPENDENCE, MISSOURI.

IMPROVEMENT IN APPARATUS FOR ILLUSTRATING TRIGONOMETRY.

Specification forming part of Letters Patent No. 115,318, dated May 30, 1871.

*To all whom it may concern:*

Be it known that I, EDWIN A. HICKMAN, of Independence, in the county of Jackson and State of Missouri, have invented a new and Improved Apparatus for Illustrating Trigonometry; and I do hereby declare that the following is a full, clear, and exact description thereof, which will enable others skilled in the art to make and use the same, reference being had to the accompanying drawing forming part of this specification.

The drawing represents a plan view of my improved instruments.

I propose to provide an instrument containing all the parts used in plain trigonometry scaled alike, and so constructed that as the secant moves around the quadrant and settles at any degree, and the other parts are placed in their relative positions, their scales announce the lengths of all, and, compared with the theory as taught in standard works, give the same results, thus showing to the eye what causes these changes of proportion, thereby fixing the theory in the mind.

A B represent the horizontal radiuses; C, sine; D, co-sine; E, tangent; F, co-tangent; G, secant; H, protractor or quadrant; I, perpendicular radius; K, versed sine; and L, versed co-sine.

These instruments are to be made so that the limbs C D E F will slide on the radiuses and the secant will turn on the center M, and it is intended that a suitable connection of the secant with the co-tangent be made, where they traverse each other, that will admit of the turning of the one and the sliding of the other, and extensions of the sine and co-sine, all applied thereto and connected together at the ends which meet at the junction of the sine and co-sine. They are confined to the latter by clips $a$, which admit of their sliding freely. It is also proposed to make a hinge-joint in the radius A at N, for it to fold over on itself, and at O a joint will be made, which will allow the part A to swing around against the edge of A. P is a clamp, to be applied for reading any distance on any limb that may need its assistance. The scale on it is nine parts to the inch, each part being $\frac{11\frac{1}{2}}{100}$; hence, by using it by attaching to any place on the sides any decimal can be obtained. The parts are all to be scaled on one edge, same as on the sides, and each limb is to be marked positive for that quadrant, but negative for the other—that is, on sine, secant, and tangent of the quadrant shown, I mark, on opposite sides, co-sine, co-secant, co-tangent, and vice versa, so that a positive line on one quadrant may be a negative on the other, and so on around the circle, thus exemplifying Art. XII, pages 218, 223, of Davies' Legendre. This may be understood by turning the instrument over to the left; then down; then to the right; by which it will be seen that all these sides and limbs regularly appear as indicated, with their properly-named sides, covering any emergency that may arise, answering all inquiries.

This instrument assists in explaining the expressions used in the text-books, and does by actual work what is claimed for imaginary lines.

By the use of the secant line and radius, it determines latitude and department of any course and distances, as the traverse table of the standard works, and then these sides show to the learner what is meant by the expressions "Dist.," "Lat.," "Dept.," and "Degree of the table." It furnishes on the three sides of the right-angled triangle scales to prove that the square of the hypotenese is equal to the square of the other two sides. It can also be used in measuring lines to inaccessible objects, and getting heights of any altitude, and the degrees of any ascent by using the instrument as a theodolite, or for getting railroad curves of any radius or degree.

In the hands of the student of mathematics all the theory is obtained for transit and chain-work, the secant representing the line of vision or direction of lines, the radiuses the points of the compass, and the scaling the distances required.

Having thus described my invention, I claim as new and desire to secure by Letters Patent—

As an article of manufacture, an apparatus for illustrating trigonometry, having the diametrical base combined with sliding sine and co-sine C D, sliding tangent and co-tangent E F, pivoted secant G, perpendicular I, and protractor M, all arranged, notated, and operated as specified.

EDWIN A. HICKMAN.

Witnesses:
JAMES L. GRAY,
EDWARD T. NOLAND.